March 21, 1933. S. P. BURKE 1,902,797
CARBON BLACK PROCESS AND APPARATUS
Filed Sept. 10, 1927
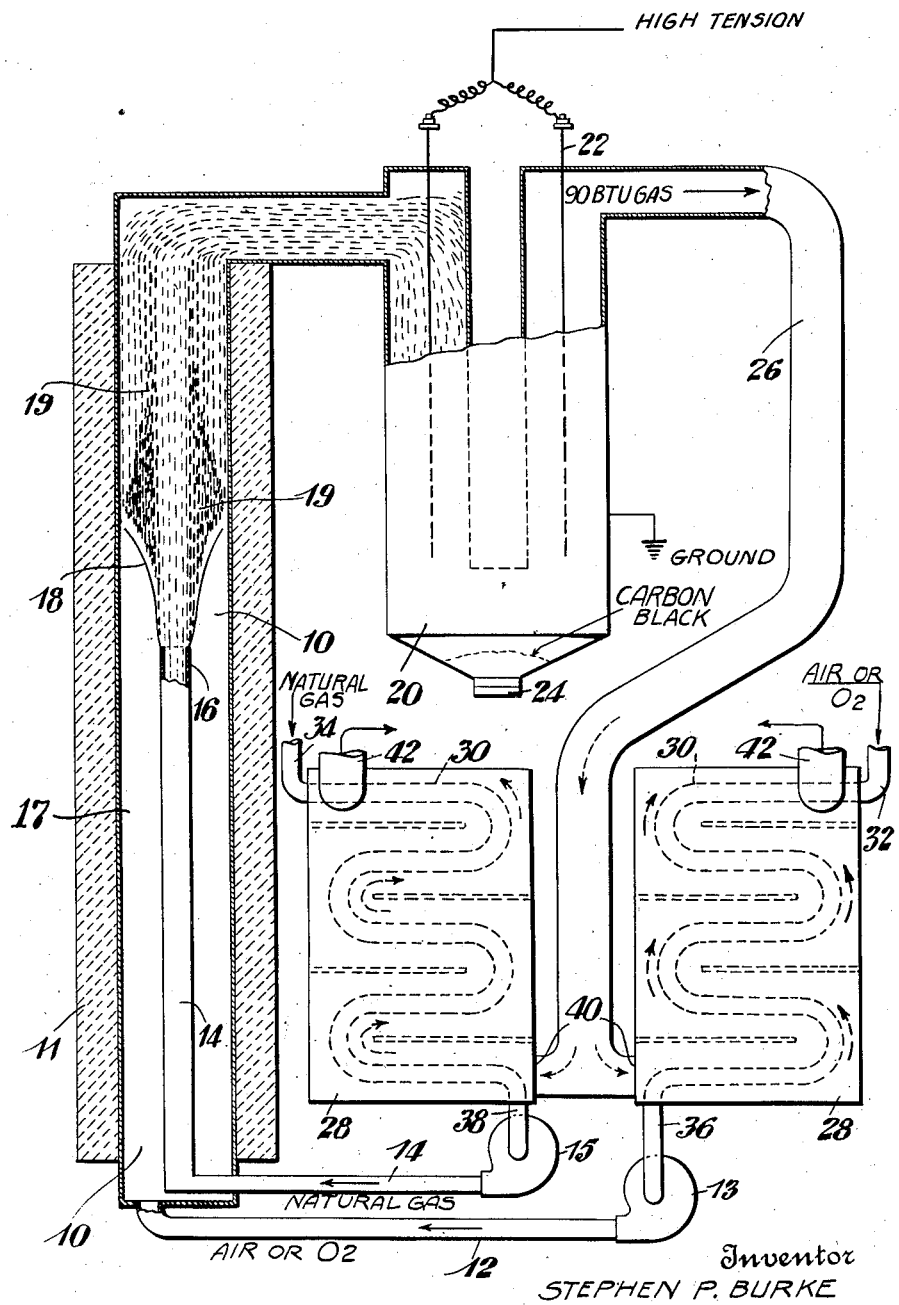
Inventor
STEPHEN P. BURKE
By his Attorney
Edmund G. Borden Patented Mar. 21, 1933

1,902,797

UNITED STATES PATENT OFFICE

STEPHEN P. BURKE, OF NEW YORK, N. Y., ASSIGNOR TO GENERAL ATLAS CHEMICAL COMPANY, OF DOVER, DELAWARE, A CORPORATION OF DELAWARE

CARBON BLACK PROCESS AND APPARATUS

Application filed September 10, 1927. Serial No. 218,755.

The present invention relates to the production of carbon black from gaseous or vaporous hydrocarbons. The principal object of the present invention is to obtain a largely increased yield of good quality black from a given amount of hydrocarbons.

It is well known that when gaseous hydrocarbons are sufficiently heated, the hydrocarbon molecules decompose, and if the intensity of heat is sufficient, carbon—so called—is formed. It has been also shown that this decomposition is accelerated or catalyzed in varying degrees by the presence of hot solid or liquid surfaces, so that at temperatures at which little or no solid carbon is formed in the body of the gaseous stream, the decomposition will nevertheless proceed rapidly at the surfaces of contact with solids and liquids. It might be considered that this surface catalytic activity would be of commercial advantage, but I have found as the result of extensive experiments that the carbon so produced is dense and gray and is gritty in character and is not suited for many commercial uses where so-called carbon black or lamp black is employed.

On the contrary, I have found that whenever hydrocarbon containing gases are heated sufficiently, in the absence of solid or liquid surfaces, to cause "carbon" formation, the carbon so produced is finely divided, soft, fluffy, and very black, and possesses those properties which are desired by the users of carbon black or lamp black.

To accomplish the decomposition by heat of gaseous hydrocarbons in the absence of solids or liquids the hydrocarbon gases or vapors are introduced into a stream of hot gases. In general, the decomposition and carbon formation in the absence of solid or liquid surfaces takes place only slowly at temperatures below 1000° C., and for rapid carbon formation the temperature should be appreciably higher. Thus, for example, the decomposition of methane with the formation of desirable carbon black may be carried on by introducing a stream of methane into a stream of inert gas such as nitrogen, which has previously been brought to a temperature of 1200° C.

Gases or vapors, when brought into contact, diffuse into each other until there is a substantially equal concentration of each gas or vapor throughout the entire volume within which they are confined. It follows that the molecules of a hydrocarbon introduced into a carbon black apparatus in which decomposing temperatures are maintained always diffuse or spread toward the walls of the apparatus. If the gases are stationary and the temperature of the gases is below that causing decomposition or if the rate of decomposition is constant, the rate at which the hydrocarbon molecules impinge upon the surrounding walls will depend upon the size of the chamber and upon the specific rate of diffusion of the particular hydrocarbon.

If, however, the temperature of the gases within a given chamber is high enough and the chamber large enough substantially all the hydrocarbon molecules will be decomposed before striking solid or liquid surfaces and this is true even though some currents (turbulence) may exist in the gases. Conditions for carrying out the above mentioned object may therefore be accomplished by using unusually large decomposing chambers or unusually high temperatures or both.

For a given apparatus and hydrocarbon assuming a more ordinary size and temperature it is evident that the rate at which the molecules impinge upon the walls due to molecular diffusion is the minimum rate at which the molecules will reach the walls of a given chamber or apparatus, again assuming that no disruption of the hydrocarbon molecules occur or that the rate of disruption of the hydrocarbon is constant. If there are any currents (turbulence) set up within the gases or vapors in the decomposing apparatus, these necessarily increase the rate at which the molecules of hydrocarbon reach some non-gaseous surface of the apparatus. It follows, therefore, that if a stream of hydrocarbon gas is introduced into a stream of hot inert gas in an apparatus of ordinary proportions, the maximum decomposition of the hydrocarbons in the gas stream and out of contact with hot walls of the containing vessel will be obtained, if the conditions of gas flow are such that viscous or stream line (non-turbulent) flow obtains.

Accordingly, it is another object of the present invention to conduct the cracking of hydrocarbon gases or vapors with the production of carbon black under conditions whereby the contact of hydrocarbons with solid or liquid surfaces at temperatures producing decomposition shall be not substantially greater than the rate of such contact due to molecular diffusion of the hydrocarbons, which conditions are accomplished by maintaining viscous or stream line flow of the gases through the decomposition chamber or zone.

Another object of the present invention is to provide an apparatus adapted to carry out the decomposition of hydrocarbon under conditions of stream line flow.

While it is perfectly feasible to bring about hydrocarbon decomposition by the use of a stream of hot inert gas in the manner previously described, it is more desirable for reasons of economy to accomplish the same result by substituting a stream of oxygen or oxygen containing gas, such as air, in place of the hot inert gas.

In this case some combustion occurs and under stream line conditions, a thin sheet of flame is formed by the inter-diffusion of the two gas streams. The heat produced by this combustion heats the gas stream to a high temperature and supplies the necessary energy for the decomposition of the hydrocarbon gases. Additional heat may be supplied, if desired, by preheating either the hydrocarbon-containing gas or the oxygen-containing gas, or both, or by heating the walls of the conduit leading to the reaction chamber.

In order that the invention may be readily practised a specific example of the process according to the present invention will be described. In the drawing the figure illustrates somewhat diagrammatically an apparatus adapted to carry out the method or process of the present invention.

Referring to the drawing, 10 is an elongated chamber, of sufficient size to prevent contact of substantial amounts of undecomposed hydrocarbon with the walls when operating under the general conditions herein disclosed. Chamber 10 is preferably vertical and has an inlet 12 at one end for admitting oxygen, air or other oxygen containing gas. At the same end of chamber 10, a pipe 14 is passed through the wall and is then carried along the axis of chamber 10 so as to lie centrally of the outer chamber. Hydrocarbon gas or vapor to be decomposed for formation of carbon black enters the apparatus through pipe 14 and discharges into chamber 10 from the pipe 14 at its mouth 16. Pipe 14 and chamber 10 form an air duct 17 surrounding pipe 14. The hydrocarbons then pass axially through the chamber 10 above the level of the top of pipe 14 and are decomposed therein with formation of carbon black. In the particular embodiment of the invention illustrated, it is obvious that the apparatus initially produces an upward flowing central stream of hydrocarbon gas surrounded by an upward flowing stream of oxygen-containing gas. The invention is not limited to this, however. The chamber 10 is covered by insulating material 11 to prevent loss of heat, and preferably the connecting pipes and chambers are heat insulated.

According to the present invention, the maximum yield of good quality carbon black from a given apparatus is obtained by maintaining conditions within the chamber 10, or at least in that zone of the chamber where combustion occurs, such that the rate of contact of the hydrocarbon molecules with the walls of the chamber shall not be greater than that due to the molecular diffusion. As previously shown, this necessitates, in apparatus of the type illustrated, that conditions of stream or viscous (non-turbulent) flow be maintained in the chamber 10, or at least in that zone of the chamber where combustion occurs. In order that this condition may be maintained, the velocity of flow of the hydrocarbon containing gas and of oxygen containing gas preferably should be approximately equal, at the time of their coming into contact in chamber 10. The ducts or pipes carrying the two gases should preferably have parallel or uniformly converging walls and should be as free as possible of obstructions which might cause turbulence of flow. While these conditions are preferable, it is to be understood that they are not absolutely necessary for obtaining stream line flow in the combustion zone of chamber 10, because when high temperatures are attained in the combustion zone of chamber 10, the viscosity of the gases becomes sufficiently great so that viscous flow obtains even though moderately turbulent flow exists in the air and gas ducts 10 and 14 before the gases are brought into contact at the mouth 16 of pipe 14. For similar reasons, satisfactory operation can be obtained even though the velocities of the gases are not the same just previous to the gases coming in contact in chamber 10. In fact, under certain circumstances slightly better results are obtained if the velocity of the oxygen containing gas slightly exceeds that of the hydrocarbon containing gas.

It will be noted, however, that in the arrangement illustrated the walls of the gas duct 14 and the air duct portion 17 of chamber 10 run parallel, or nearly so, for a distance which is large in comparison to the diameter or thickness of the gas duct, and in comparison to the thickness of the air duct portion 17 of chamber 10. Also, the chamber 10 is preferably straight sided, having the same form and cross sections substantially throughout its length. By this arrangement the gas is directed as nearly into parallel flow as possible even when the air or gas, or both, have velocities exceeding those consonant with stream line flow.

In order that the velocities of the gases in the apparatus may be controlled as desired, I prefer to provide rotary pumps or blowers 13 and 15 in pipes 12 and 14 respectively. By varying the speed of pumps 13 and 15 the desired proportions of hydrocarbon to non-hydrocarbon may be constantly maintained in chamber 10 to obtain an optimum yield of high grade carbon black and to assist in maintaining stream-line flow in the zone of decomposition of the hydrocarbon.

For the production of carbon black in good yields the ratio of the quantity of oxygen supplied by the oxygen-containing gas to the quantity of hydrocarbon containing gas admitted to chamber 10 should be considerably less than that required for complete combustion of the hydrocarbons. Under these conditions, when the gas is ignited in chamber 10, a surface of flame 18 is produced which stretches upward and outward from the mouth 16 of the hydrocarbon gas duct. The position of this flame sheet or surface is essentially the locus of all points where, due to the interdiffusion of the two gas streams, the concentration of oxygen and hydrocarbons (assuming in this case that the only combustible gases present are hydrocarbons) is such as to satisfy the stoichiometrical equation for complete combustion as shown

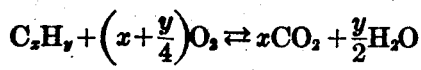

$$C_xH_y + \left(x + \frac{y}{4}\right)O_2 \rightleftarrows xCO_2 + \frac{y}{2}H_2O$$

So closely does this condition obtain that I have found it possible to calculate mathematically the locus of all such points on the basis of the well known laws of gaseous diffusion, and the mathematical surface thus obtained coincides almost exactly with photographs of the flames experimentally obtained in this apparatus, thus confirming in a most precise manner the mixing of the gases by diffusion only and the presence of stream line or viscous flow.

It will be seen therefore that, assuming a non-turbulent flow of the gases at constant rates, the flame surface or interface at which complete combustion occurs remains substantially fixed in space. It will be readily understood that the actual shape of this flame front or surface in any given case depends on the chemical composition of the hydrocarbon containing gas and of the oxygen containing gas; on the size and shape of the gas ducts and of the chamber 10; and on the relative quantities of each gas supplied. In every case, however, where the amount of oxygen supplied to chamber 10 is less than that required for complete combustion of the combustible gases supplied, the flame surface in which complete combustion occurs will flare upward and outward like an inverted bell, as is shown in the accompanying drawing. On the other hand, if sufficient oxygen were admitted for complete combustion of all the combustible gas supplied, the flame surface would converge to a point as in the case of any gas burning freely in air.

In other words, the flame front inclines forwardly away from the hydrocarbon stream and toward the oxygen bearing stream as referred to the direction of flow of the gases. The heat liberated by the combustion in this flame surface furnishes the energy for the decomposition of the gaseous or vaporous hydrocarbons. This decomposition occurs in a narrow zone or surface adjacent the flame surface 18 and beyond the flame surface in the direction of gas flow as appears clearly in the drawing in which the carbon formed by the decomposition is indicated by numeral 19. The zone of carbon formation is spaced from the flame sheet or surface 18 by a narrow zone in which carbon monoxide is formed. The carbon as it is formed becomes incandescent and ascends within and on the opposite side of the flame surface from the oxygen-bearing stream, in the manner shown. The flame surface and the hot gases present in the said narrow zone of carbon monoxide formation thus may be said to serve as a viscous envelope to insulate the carbon when formed from direct contact with the highly heated oxygen-bearing stream. The formation of carbon monoxide is discussed more in detail herein below.

It is evident from the mechanism employed to effect the decomposition of the hydrocarbons that by suitably adjusting the relative amounts of hydrocarbons and oxygen containing gas, and the rate of flow thereof through the reaction chamber 10 only minimal amounts of hydrocarbons which escape combustion or decomposition can come in contact with the solid containing walls of chamber 10. Numerous analyses of the gas taken from the vicinity of the hot chamber walls above the flame surface 18 show that the concentration of hydrocarbons in this gas is considerably less than 0.5% even when the amount of oxygen supplied to the chamber 10 is less than 40% of that required for complete combustion of the hydrocarbons supplied.

The carbon so formed passes out of chamber 10 in the gas stream and is collected in the chamber 20. This removal of carbon black from the gas stream may be accomplished by electrical precipitation or by cooling the gases and filtering the carbon by means of bag filters or by any other means for accomplishing the desired end. As illustrated, electrical precipitation means 22 are provided for removing the carbon black from the gas stream in chamber 20. The black is removed from the apparatus at the point 24.

While flame combustion of hydrocarbon gas produces carbon dioxide ($CO_2$) and water ($H_2O$), these hydrocarbons are also capable of combining with oxygen to form carbon monoxide (CO) and hydrogen ($H_2$). Consequently, when a mixture of hydrocarbon containing gas and oxygen containing gas in which the amount of oxygen is less than that required for theoretically complete combustion of the hydrocarbons but yet sufficient to support a flame is permitted to burn, the products of reaction are ordinarily a mixture of carbon dioxide, carbon monoxide, hydrogen, and water. No carbon black is formed under these conditions. The formation of carbon monoxide by direct oxidation of the hydrocarbons is thus objectionable in that it converts hydrocarbons into undesirable gaseous products instead of into carbon black, which is the object of the present process. By maintaining conditions of stream line flow in the combustion zone, the formation of carbon monoxide by the direct oxidation of carbon can be maintained at a minimum, even at the high temperatures employed in the present invention. This fact constitutes another reason for the use of non-turbulent or viscous flow when the energy for decomposing the hydrocarbons is supplied by the use of an oxygen containing gas rather than a hot inert gas.

Since the rate and extent of the decomposition of the hydrocarbons to form carbon black is a function of the thermal energy supplied to the hydrocarbon molecules, it is to be expected that if heat losses due to conduction and radiation from the flame surfaces can be decreased, the yield of carbon black should be increased. In confirmation of this I have found that by the use of heat insulation 11 on the walls of apparatus the yield of carbon black is increased.

Under these conditions the gases leaving the combustion chamber carry the maximum amount of sensible heat. This heat may be recuperated if desired. It is to be understood, of course, that since, according to this invention, the amount of oxygen supplied is always less than is required for complete combustion, the gaseous products leaving the zone of decomposition consist, in addition to carbon dioxide and water, of carbon monoxide, hydrogen, and small amounts of undecomposed hydrocarbons, and, consequently, are of considerable value as a fuel gas.

The gaseous products, or tail gas, leaving the apparatus after the black is separated carry approximately 30 to 50% of the latent heat of the hydrocarbon gas admitted to the apparatus and have a B. t. u. value of 50 to 100 B. t. u. per cu. ft. depending upon the ratio of oxygen to hydrocarbons employed. As illustrated, means are proposed for utilizing the sensible heat of the gases leaving chamber 20 or for utilizing both the sensible heat of said gases and some or all of their latent heat. When the sensible, or the sensible and latent heat, of gases leaving chamber 20 is, or are, to be utilized, the gases are conveyed through conduit 26 to one or more preheaters 28, 28. As illustrated, two preheaters are provided, one for preheating air and the other for preheating hydrocarbon for use in the chamber 10. Preheaters 28 contain coils 30, 30 through which the oxygen bearing gas and the hydrocarbon flow counter-current to the gases surrounding the said coils. The sensible heat of the gas is thereby transferred in large measure to the air and hydrocarbon. For this purpose the air or oxygen and hydrocarbon enter the coils 30 of the preheaters 28 at the points 32 and 34 respectively and leave said coils at the points 36 and 38 respectively. In the apparatus as illustrated, the waste gases enter preheaters 28 at the points 40, 40 and leave preheaters 28 at the points 42, 42. If it is desired to transfer the latent heat of the gases leaving chamber 20 to the air and/or hydrocarbon passing to chamber 10, one or both of preheaters 28 may be operated as stoves. The points 36 and 38 at which the air, or other oxygen-bearing gas, and the hydrocarbon leave the preheaters 28 are connected to the pipes 12 and 14 respectively so that the air and hydrocarbon pass directly from the preheaters, if used, to the carbon black apparatus. It will be understood that preheaters 28 and pipes 12 and 14 may be covered by heat insulating material.

The yield and especially the character of the carbon black produced by "stream-line" combustion are largely functions of the ratio of oxygen to hydrocarbon gas admitted to the chamber 10. For the production of a carbon black which is suitable as a substitute for the black commercially available at present under the name "gas black" and made by the combustion of natural gas by the "channel" or a similar process, I prefer to employ a ratio of oxygen to hydrocarbons such that the amount of oxygen supplied is about 50 to 70 per cent. of that required for complete combustion of the hydrocarbons to produce $CO_2$ and $H_2O$. The portion of the hydrocarbon which is not converted into $CO_2$, CO and $H_2O$ is substantially all decomposed to carbon and hydrogen. It has been found that the yield according to this process may be more than ten times as great as that obtained by the present commercial processes for the production of channel black. When operating according to the present invention, practically all of the carbon black obtained is of the highest commercial grade while the yield of black is a high percentage of that theoretically possible under the given conditions.

Moreover, I have found that the carbon black so produced has certain points of superiority over the "gas black" produced by the processes in commercial operation at present. When substituted for the usual grade of carbon black in compounding rubber, it gives a greater increase in the tensile strength of the resulting rubber product. When employed as a pigment for paints, inks, etc., it gives the product a distinctly blue tone which is much preferred to the brown tone of ordinary gas black.

While the use of oxygen containing gas with the consequent production of a flame surface is preferred in carrying out the process according to the present invention, it has been indicated that a flame is not essential. If desired, the hydrocarbon can be brought into contact with highly heated neutral gases such, for instance, as nitrogen, carbon monoxide, or hydrogen and the hydrocarbon cracked or decomposed along an interface of contact between the two gas streams in a manner similar to that described above for cracking the hydrocarbon along the flame interface, provided, of course, that the neutral gases are at a sufficiently high temperature. For this purpose, it is preferred that the neutral gases be at a temperature of at least 1300° C. In this case also the use of stream line flow is essential to the production of the maximum amount of high quality black from a given apparatus. Also, it is preferred to preheat the hydrocarbon. However, the flame method permits using a smaller and cheaper apparatus and gives better overall commercial results at present prices for natural gas. If desired, at least part of the heat for the process may be transmitted to the neutral or inert gas from the walls of the decomposing chamber.

While the apparatus illustrated in the drawing is illustrated as having the axis of flow of the gas streams in vertical position, I do not limit myself to this. Nevertheless, unless the two gas streams are brought very carefully to the same temperature before being brought into contact, the axis of flow of the streams cannot be horizontal, or materially inclined, without producing a degree of turbulence incompatible with the present invention. This is for the reason that the cooler gas inevitably settles through and, therefore, mixes bodily with the warmer or hotter gas as soon as the two come into contact, as distinguished from the mixing due to molecular diffusion.

While the flow of gases when operating according to the present invention is preferably vertically upward, it may be vertically downward with almost as good results and may even be horizontal under conditions mentioned above.

It will be seen from the foregoing that owing to the shape of flame 18 and its position relative to the unburned hydrocarbon undergoing decomposition, the hydrocarbon to be decomposed not only does not come into contact with solid or liquid surfaces, but does not contact directly with the zone of carbon dioxide formation which furnishes the heat for the decomposition of the hydrocarbon.

It will be understood that while I have illustrated and described herein a specific process and apparatus for making a carbon black I do not wish to be limited to the details illustrated or described herein except insofar as such details are clearly and positively included in the appended claims.

Furthermore, the process herein described may be carried out by other apparatus than that herein illustrated and described in detail.

Having thus described my invention what I claim as new is:

1. A method of making carbon black including diffusing a gaseous or vaporous hydrocarbon into a stream of highly heated gas while they are flowing along a predetermined path within an enclosed unobstructed space, decomposing said hydrocarbon in said stream by heat with the production of carbon black while maintaining nonturbulent stream line flow of the gases within the zone of decomposition of said hydrocarbon.

2. The method of making carbon black which includes flowing contacting, nonturbulent streams of gas and of gaseous or vaporous hydrocarbon in the same direction within an enclosed unobstructed space, diffusing said hydrocarbon into said gas at a controlled rate and decomposing said hydrocarbon in said gas by heat under such conditions of relative velocity and temperature that streamline flow of the respective streams is effected and that the hydrocarbon forms carbon black and only minimal amounts of the hydrocarbons are decomposed in contact with non-gaseous surfaces.

3. The method of making carbon black which includes diffusing hydrocarbon into a gas in a zone of uniform cross section at the temperature of decomposition of said hydrocarbon while maintaining nonturbulent stream line flow of said gas and said hydrocarbon in a give direction throughout said zone.

4. The method of producing carbon black which consists in introducing a stream of hydrocarbon-containing gas within a confined stream of oxygen-containing gas flowing in the same direction at approximately the same velocity, heating the said streams to initiate combustion adjacent to their surfaces of contact with each other thereby maintaining a thin flame sheet of predetermined shape and size at the interface between the streams, thereby heating the hydrocarbon on the interior portion of the hydrocarbon stream to its temperature of decomposition, and maintaining a ratio of oxygen to hydrocarbon in the flowing streams insufficient for complete combustion of the latter.

5. A method of producing carbon black which comprises flowing parallel streams respectively of gaseous hydrocarbon and an oxygen-containing gas along an elongated enclosed heat-insulated path of constant cross-section at approximately the same velocity, heating the said flowing streams of gases and adjusting the rate of flow thereof to control the rate of diffusion of the latter at their respective surfaces of contact during their passage along the enclosed path, and to decompose portions of the hydrocarbon in the interior of the hydrocarbon stream to form carbon black, removing and cooling the carbon black, and maintaining the latter substantially out of direct contact with the oxygen-containing gas until substantial cooling has been effected.

6. The process of forming carbon black from a gaseous hydrocarbon which comprises flowing within an enclosed path of uniform cross-section contacting streams respectively containing a gaseous hydrocarbon and a combustion-supporting fluid flowing in the same direction at approximately equal velocities, the latter being in amounts insufficient for complete combustion of the hydrocarbon, diffusing said hydrocarbon into the combustion-supporting fluid under conditions to maintain a thin flame sheet of determinate shape and size by combustion of portion of the said hydrocarbon, decomposing other portions of the hydrocarbon with production of carbon black by the heat of said flame sheet, and controlling the conditions of relative velocity and the temperature of the respective streams of hydrocarbon and combustion-supporting fluid thereby to produce a non-turbulent, streamline flow of the gases and carbon black substantially throughout the zone of the said flame sheet.

7. The method of forming carbon black which comprises flowing contacting non-turbulent streams respectively comprising a highly-heated combustion-supporting gas and a highly heated gaseous hydrocarbon moving in the same direction, diffusing said hydrocarbon into the said combustion-supporting gas at a controlled rate to combust portions of the hydrocarbon at a determinate rate to produce additional heat, decomposing by the heat originally present and that produced by the said combustion other portions of the hydrocarbon in the presence of the said combustion-supporting gas thereby forming carbon black moving in non-turbulent stream-line flow within a hydrocarbon stream surrounded by a flowing protective stream of gases resistant to the passage therethrough of the combustion supporting gas.

8. The process of producing carbon black and hydrogen which comprises flowing at a constant rate through a decomposition zone of uniform cross-section a non-turbulent gaseous stream composed of contacting strata respectively comprising a gaseous hydrocarbon and a combustion-supporting gas. the latter being present in amounts about 50 to 70% of that required for complete combustion of the gaseous hydrocarbon, heating the gaseous stream to initiate combustion adjacent to the surface of contact of the hydrocarbon and the combustion-supporting gas and, by means of the resultant heat of combustion, decomposing the portions of hydrocarbon remote from the said surface of contact to form hydrogen and carbon black controlling the conditions of velocities of the strata comprising the gaseous hydrocarbons and that of the combustion-supporting gas and the temperature within the decomposition zone thereby to produce and maintain a streamline flow of the gases and the carbon black carried thereby substantially throughout the said decomposition zone, cooling the mixture and separating the carbon black from the hydrogen.

9. Apparatus for making carbon black comprising a furnace having insulated walls forming an elongated combustion chamber, a gas duct within the chamber having walls parallel to those of the latter, an air duct concentric with the said gas duct and having its walls forming a continuation of the chamber walls, and means for independently controlling the rate of fluid flow respectively through the gas duct and the air duct.

10. Apparatus for making carbon black comprising an elongated heat insulated chamber having side walls of substantially uniform cross section throughout their length, an air duct within said chamber having walls coinciding with those of said chamber, a gas duct enclosed within the said air duct within the combustion chamber and having walls parallel to those of the air duct, the length of the walls of the gas duct enclosed by the air duct being at least twice the diameter of the air duct.

11. The process of making carbon black which comprises flowing through a heated enclosed space a stream of hydrocarbon-containing gas within a confined stream of oxygen-supplying gas flowing in the same direction, heating the said flowing fluid streams to form a zone of hydrocarbon decomposition, and controlling the velocities of the respective fluid streams and the temperature thereof within the said enclosed space to produce a non-turbulent stream-line flow of the streams throughout the said zone of hydrocarbon decomposition.

12. The method of producing carbon black comprising the steps of introducing parallel streams respectively comprising hydrocarbon gas and an oxygen-containing gas flowing at approximately the same velocity within an unobstructed heated chamber free from abrupt changes in transverse cross-section, the oxygen-containing gas being present in amount insufficient for the complete combustion of the hydrocarbon gas, burning a portion of the hydrocarbon gas at its surface of contact with the oxygen-containing gas, and controlling the temperatures and rates of flow of the respective gas streams through the chamber thereby to produce and maintain a streamline flow of the gases substantially throughout the zone of burning of the hydrocarbon.

13. The process of making carbon black which comprises flowing in the same direction within an enclosed heat-insulated space of streamline shape, non-turbulent streams respectively comprising a heated oxygen-bearing gas and a heated gaseous hydrocarbon, under conditions to combust controlled proportions of the hydrocarbon adjacent the surface of contact thereof with the oxygen-bearing gas thereby forming a hydrocarbon decomposition zone, and controlling the conditions of temperature and the relative rates of flow of the respective fluid streams within the heat-insulated space thereby to produce a streamline flow of the said fluids throughout the said zone of hydrocarbon decomposition and to maintain therein a thin flame sheet of determinate shape and size.

14. The process of forming carbon black which includes flowing in the same direction within an enclosed decomposition zone of substantially streamline shape throughout its length, contacting streams respectively containing an oxygen-bearing fluid and natural gas, heating the flowing streams within the decomposition zone to combust controlled portions of the natural gas at the surface of contact thereof with the oxygen-bearing gas and to form carbon black within the natural gas stream, and controlling the velocities of the respective streams and the temperatures maintained in the decomposition zone thereby to produce and maintain a streamline flow of the respective streams carrying carbon black substantially throughout the said zone.

15. The process of making carbon black which comprises flowing contacting streams respectively containing a gaseous hydrocarbon and a non-reducing gas in the same direction through a heated enclosed space, the said non-reducing gas having a temperature of at least 1300° C., controlling the velocities of the said streams and the temperature within the enclosed space thereby producing and maintaining a streamline flow of the gases and the carbon black formed therein by decomposition of a portion of the gaseous hydrocarbon substantially throughout their path of travel within the said heated enclosed space.

16. The process of making carbon black which comprises introducing a stream of hydrocarbon-containing gas within a confined stream of oxygen-supplying gas flowing in the same direction, heating the said fluid stream, and controlling the velocities of the respective fluid streams and the temperatures thereof substantially throughout the period of the said heating, thereby producing a non-turbulent streamline flow of the said streams throughout the period of such heating.

17. The process of making carbon black which comprises introducing a stream of hydrocarbon-containing gas within a confined stream of oxygen-supplying gas flowing in the same direction within a heated enclosed space, and so adjusting the velocities of flow of the respective fluid streams through the said enclosed space and the temperature therein, thereby producing and maintaining a streamline non-turbulent flow of the said streams through said space.

18. The process of making carbon black which comprises diffusing a gaseous or vaporized hydrocarbon into a highly-heated gas while the hydrocarbon and the said gas are flowing in parallel contiguous streams within an unobstructed, heated enclosed space, decomposing the hydrocarbon in the said flowing stream by heat with the production of carbon black, and controlling the respective velocities of flow of the hydrocarbon and the said gas and also the temperature existing within the said enclosed space, thereby maintaining non-turbulent streamline flow of the gases substantially throughout the zone of decomposition of the hydrocarbons.

19. The process of making carbon black which comprises diffusing a gaseous or vaporized hydrocarbon into a combustion-supporting gas while the said hydrocarbon and combustion-supporting gas are flowing in parallel contiguous streams within an unobstructed enclosed space, combusting controlled portions of the hydrocarbon with portions of the combustion-supporting gas while heating the enclosed space and the fluids therein, and controlling the respective velocities of flow of the said hydrocarbon and the combustion-supporting gas and the temperature existing within the said enclosed space for maintaining non-turbulent streamline flow of the gases and the carbon black carried thereby during their passage within the enclosed space.

20. The process as defined in claim 19 including the step of preheating at least one of the fluid streams prior to its introduction into the enclosed space.

21. The process as defined in claim 19, in which the said unobstructed enclosed space is substantially free from abrupt changes in cross-section within the zone of hydrocarbon decomposition therein.

22. Apparatus for making carbon black comprising a combustion chamber having enclosing walls, a gas duct in the lower portion of the chamber, at least a major portion of the walls of the said gas duct being parallel with and uniformly spaced from immediately adjacent portions of the chamber walls, an air duct surrounding the gas duct and having at least a portion of its walls forming a continuation of the chamber walls, and means for independently controlling the rate of fluid flow respectively through the gas duct and the air duct.

In testimony whereof I affix my signature.

STEPHEN P. BURKE.